May 11, 1943.   A. L. PARKER   2,318,962
VALVE ASSEMBLY
Filed Aug. 3, 1940
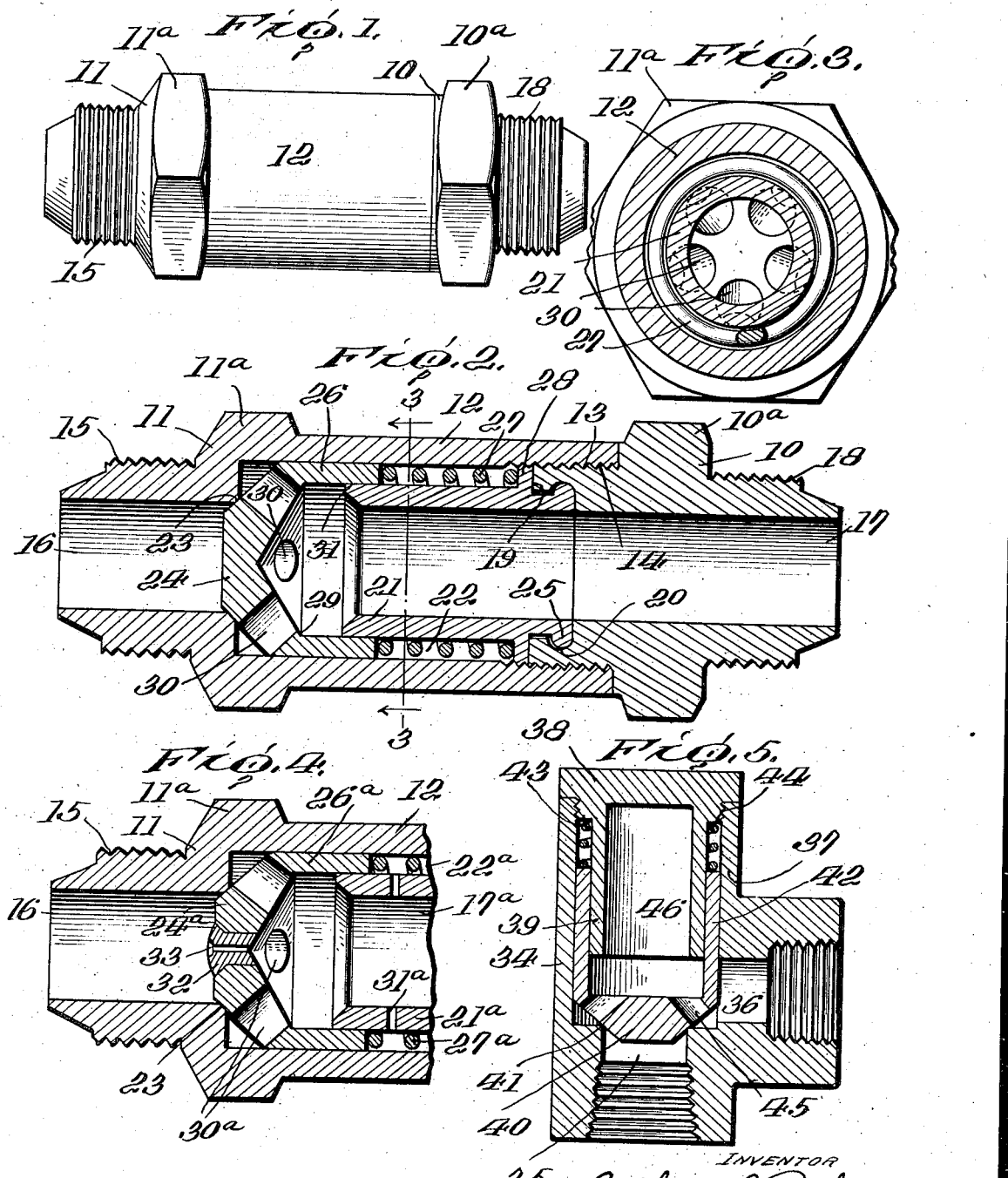
INVENTOR
Arthur L. Parker
Mason & Porter
ATTORNEYS Patented May 11, 1943

2,318,962

UNITED STATES PATENT OFFICE 2,318,962

VALVE ASSEMBLY

Arthur L. Parker, Cleveland, Ohio

Application August 3, 1940, Serial No. 350,762

5 Claims. (Cl. 251—146)

The present invention relates to new and useful improvements in a valve assembly for controlling the passage of fluid, and more particularly to improvements in a valve assembly in the form of a check valve for use in hydraulic pressure lines.

An object of the present invention is to provide a valve assembly of the above type which is constructed and arranged to eliminate chattering or pounding and to occupy a minimum amount of space, thus enabling the valve assembly to be used with extremely small pipe or tube connections.

Another object of the invention is to provide a valve assembly of the above type wherein chattering or pounding of the valve member is prevented by means of a cushioning chamber which is disposed so as not to interfere with the passage of fluid through the inlet and outlet pipe or tube connections.

A further object of the invention is to provide a valve assembly of the above type wherein chattering or pounding of the valve member is prevented by means of a cushioning chamber disposed peripherally around the inner surface of the valve casing so that no obstruction is offered to the passage of fluid therethrough and so as to permit the valve assembly to be made in small sizes.

A still further object of the invention is to provide a valve assembly of the above type wherein restricted communication is provided between the cushioning chamber and the fluid remaining on the discharge side of the valve, this restricted communication operating to effect a cushioning or checking of the movement of the valve member in either direction so as to prevent chattering or pounding thereof.

The above and other objects of the invention will in part be obvious and will hereinafter be more fully pointed out.

In the accompanying drawing:

Figure 1 is a side elevation of the valve assembly.

Figure 2 is a enlarged longitudinal sectional view of the valve assembly, showing the valve member in a seated position.

Figure 3 is a sectional view taken along the line 3—3 of Figure 2.

Figure 4 is a fragmentary longitudinal sectional view of a modified form of valve assembly.

Figure 5 is a sectional view of a still further modified form of valve assembly particularly adapted for use in angle fittings.

Referring more in detail to the accompanying drawing, and particularly to Figures 1, 2, and 3, the valve casing is illustrated as including male and female coupling parts 10, 11, respectively. The female casing part 11 includes a skirt or sleeve portion 12 which provides a housing for the valve and which has one end thereof internally threaded, as at 13, to threadedly receive an externally threaded portion 14 on the male casing part 10. The male and female parts 10, 11, are provided with non-circular wrench engaging portions 10a, 11a, respectively, so that these parts can be tightly secured together. The female part 11 is provided with an outward externally threaded extension 15 which is centrally bored to provide an inlet passage 16. The extension 15 is adapted to be secured to a pressure supply or inlet line. The male part 10 is centrally bored to provide a longitudinal discharge passage 17 and this male part is also provided with an outward externally threaded extension 18 which is adapted to be secured to a discharge or outlet line.

The inner end 19 of the portion 14 on the male member 10 is reduced in internal diameter and is provided with an internal annular recess 20. A sleeve or skirt member 21 extends inwardly from the male member 10 and has the outer surface thereof spaced inwardly from the adjacent inner surface of the casing sleeve 12 so as to provide a peripheral chamber 22 therebetween. The inner surface of the sleeve member 21 is substantially flush with the inner surface of the discharge passage 17 so as to provide for the free flow of fluid therethrough. The inner end of the sleeve member 21 is spaced from a valve seat 23 which is formed around the inner edge of the inlet passage 16 in the female part 11.

The sleeve member 21 may be formed integral with the male part 10 and with such a construction, the parts must be accurately machined so that they may be perfectly concentric for proper operation of the valve. In order to permit the machining of the parts in a somewhat less accurate and less expensive manner, the sleeve member is illustrated as being separate from the male part 10 and the opposite end of the sleeve member 21 is provided with an outwardly extending annular rib 25 which is adapted to extend within the annular recess 20. This connection between the sleeve member 21 and the male part 10 is a relatively loose connection so that the sleeve member 21 is adapted to float within the inwardly extending peripheral skirt portion 26 on the valve member 24. With this construction, the various parts have an opportunity to become properly centered so as to assure proper seating of the valve member.

The valve member 24 has a closed surface extending across the passage 16 and is provided with suitably shaped surfaces which are adapted to tightly close the passage 16 when in contact with the valve seat 23. The outer surface of the skirt portion 26 on the valve member fits against the inner surface of the casing part 12 and extends within the space provided between the inner surface of the casing part 12 and the outer surface of the sleeve member 21. Thus, the skirt portion 26 on the valve member serves as a substantial closure for the chamber 22 and is permitted to move relative thereto so that the effective size of the chamber is varied upon movement of the valve member.

The disposition of the valve skirt 26 between the outer surface of the sleeve member 21 and the inner surface of the casing part 12 affords longitudinal guiding means for the valve member although the valve member is substantially free to rotate so that it will center itself on the valve seat. With this construction, the valve skirt provides a movable closing wall for the cushioning chamber 22. However, bleeding of fluid between the chamber 22 and the fluid discharge passage is permitted between the adjacent surfaces of the sleeve member 21 and the valve skirt 26.

A coil spring 27 is disposed around the sleeve member 21 within the chamber 22 and bears against a flange 28 on the sleeve member 21 and also against the valve skirt 26. The coil spring 27 thus tends to normally force the valve member 24 toward a seated position. A sufficient space is provided between the inner end of the sleeve member 21 and the adjacent surface 29 of the valve member 24 so that the valve member is capable of reciprocating within the valve casing. Between the valve skirt portion 26 and the closure portion, a plurality of spaced openings 30 are provided. These openings 30 are in communication with the discharge conduit 17 and, when the valve member 24 is opened or raised from the seat 23, fluid will pass from the inlet passage 16 through the ports 30 into the discharge passage 17.

When the valve assembly is connected in a hydraulic pressure line, that is, between the inlet or supply line and the discharge or outlet line, fluid under pressure from a pump or other suitable source of supply will enter the inlet passage 16 and exert an opening force against the valve member 24. When the pressure reaches a degree sufficient to overcome the normal closing action of the spring 27, the valve member 24 will be shifted away from the valve seat 23 so that fluid will pass through the openings 30 into the valve casing and through the discharge passage 17. Fluid on the discharge side of the valve member 24 will gain access to the cushioning chamber 22 through the restricted communication afforded by the adjacent contacting surfaces of the valve skirt 26 and the sleeve member 21, as indicated by the numeral 31. Movement of the valve member away from the seat 23 will cause the valve skirt 26 to reduce the effective size of the chamber 22. The amount of bleeding afforded between the surfaces 21, 26 is relatively small but fluid will gain access to the chamber 22. The escape of fluid from the chamber 22 is thus substantially retarded so that the fluid present within the chamber 22 will act as a cushioning means to prevent sudden movement of the valve member in this direction. Thus, pounding of the portion 29 of the valve member against the end of the sleeve member 21 is prevented.

When the pressure in the inlet line is reduced below a predetermined degree, the spring 27 tends to force the valve member 24 toward its closed position resting on the valve seat 23. During this closing movement of the valve member 24 a partial vacuum is created within the chamber 22, since the restricted communication retards flow of fluid from the discharge passage 17 into the chamber 22. Thus, pounding of the valve member 24 on the seat 23 is prevented and this elimination of pounding or chattering also serves to eliminate any peening of the valve member in striking the seat.

In Figure 4 of the accompanying drawing, there is shown a modified form of valve member, as well as a modified form of sleeve member. In some cases, it is desirable to afford restricted communication between the cushioning chamber 22a and the discharge passage 17a by relatively small apertures 31a which extend through the sleeve member 21a, as shown in Figure 4. With this type of construction, movement of the valve member 24a away from the valve seat 23 will cause the valve skirt 26a to reduce the effective size of the chamber 22a. The apertures 31a are relatively small and thus retard the escape of fluid from the chamber 22a so that the fluid present within the chamber 22a acts as a cushioning means to prevent sudden movement of the valve member in this direction. Similarly, when pressure in the inlet line is reduced below a predetermined degree the spring 27a tends to force the valve member 24a toward its closed position resting on the valve seat 23. During this closing movement of the valve member 24a, a partial vacuum is created within the chamber 22a, since the restricted communication afforded by the apertures 31a retards flow of fluid from the discharge passage 17a into the chamber 22a.

In Figure 4, there is also shown a modified form of valve member 24a which is useful in certain types of hydraulic systems where some reverse flow through the valve assembly is desirable. Thus, such a construction might be applied for controlling various retractable landing gear mechanisms for airplanes where it is desired to prevent too rapid movement of the landing gear from its retracted position. In such an application, hydraulic power would be used to retract the landing gear, but, in reverse movement, it would be desired to restrict rapid movement of the landing gear which would be caused by the weight thereof. For this purpose, the valve member 24a is drilled to provide a relatively large hole through the center thereof. The valve member 24a is made of relatively hard material and before it is brought to the final heat treated hardness, this hole is drilled. The relatively soft rivet 32 is driven into the hole through the valve member and this rivet may be further drilled to provide a relatively small bleed hole 33. With such a construction, the relatively soft rivet 32 may be drilled at the manufacturer's plant or at the place of installation of the valve assembly.

This general type of check valve assembly may also be employed in angle fittings, as shown in Figure 5 of the accompanying drawing. In this form of the invention, the valve casing 34 is provided with inlet and outlet fluid passages 35, 36, respectively, which are disposed at angles to one another. In line with the passage 35, the valve casing is provided with a internally threaded sleeve portion 37 to which a cap 38 is threadedly secured. The cap 38 has a depending skirt portion 39, the outer surface of which is spaced inwardly from the inner surface of the sleeve portion 37 on the valve casing 34. The valve member 40 has a closed central portion which is adapted to cooperate with a seat 41 around the passage 35. The valve member 40 is also provided with an upstanding sleeve or skirt portion 42 which fits within the space provided between the depending sleeve 39 and the inner surface of the casing sleeve 37. Thus, the valve member is guided in this space and, as pointed out in connection with Figures 1, 2, and 3, bleeding of fluid is permitted between the adjacent contacting surfaces of the sleeves 39, 42. The free end of the valve sleeve 42 is spaced below the cap 38 so as to provide a cushioning chamber 43 and the valve sleeve 42 forms a movable wall for this chamber. A coil spring 44 is disposed within the chamber and bears against the inner surface of the cap 38 and the end of the valve sleeve 42, thus tending to normally force the valve member 40 toward a seated position.

The valve member may be provided with passages 45 in order to permit fluid to gain access to the chamber 46 which is formed within the inner surface of the depending sleeve 39. This fluid will gain access by bleeding to the cushioning chamber 43 so that movement of the valve member 40 away from the seat 41 will tend to be checked. Similarly, as pointed out in the previous description, movement of the valve member toward a seated position will also be checked by reason of the restricted communication afforded between the chamber 46 and the cushioning chamber 43.

From the foregoing description, it will be seen that the present invention provides a check valve assembly wherein cushioning means are provided for preventing chattering of the valve member during opening and closing movements thereof. Restricted communication is afforded between the cushioning chamber and the discharge passage by bleeding between adjacent surfaces which include the inner surface of the movable valve skirt portion, or by relatively small apertures which extend through the sleeve member on the male part. The valve sleeve portion is illustrated as forming a movable confining wall of the cushioning chamber so that the effective size of the chamber is varied upon movement of the valve member. The cushioning means is disposed so that it will not interfere with the free flow of fluid through the inlet and discharge connections. Thus, the valve assembly can be employed for use with very small pipe or tube lines without substantially increasing the external diameter thereof. Small pipe fittings of this type are generally employed in the hydraulic pressure systems of aircraft and the present invention affords an efficient check valve assembly for use in such lines in that the valve assembly can be made extremely small, thus enabling it to conform to weight and size requirements.

It is to be clearly understood that various changes in the details of construction and arrangement of parts may be made without departing from the scope of the invention as set forth in the appended claims.

I claim:

1. A check valve assembly for use in fluid pressure lines, comprising a valve casing having male and female parts, a valve seat disposed within said valve casing, a valve member adapted to cooperate with said valve seat for controlling the passage of fluid through the casing, a sleeve member relatively loosely connected with the male part of said casing and slightly spaced inwardly of the female part of said casing whereby to provide an annular chamber around the inside of the casing without obstructing the free flow of fluid therethrough, said valve member having a skirt portion extending into said chamber and forming a movable wall thereof, and means providing restricted communication between the chamber and the discharge side of said valve member whereby to retard the flow of fluid between the chamber and the discharge side of the valve member in order to prevent chattering of the valve member incident to reciprocation thereof.

2. A check valve assembly for use in fluid pressure lines, comprising a valve casing having male and female parts, a valve seat disposed within said casing, a valve member adapted to cooperate with said valve seat for controlling the passage of fluid through the casing, the male part of said casing having an annular recess opening inwardly thereof, a sleeve member having an outward annular shoulder adapted to fit within said annular recess for loosely connecting said sleeve member to the male part of said casing, said sleeve member being spaced inwardly from the female part of said casing whereby to provide an annular chamber around the inside of the casing without obstructing the free flow of fluid therethrough, said valve member having a skirt portion extending into said chamber and forming a movable wall thereof, and means providing restricted communication between the chamber and the discharge side of said valve member whereby to retard the flow of fluid between the chamber and the discharge side of the valve member in order to prevent chattering of the valve member incident to reciprocation thereof.

3. A check valve assembly for use in fluid pressure lines, comprising a valve casing having inlet and outlet ports, a valve seat disposed within said valve casing around one of said ports, a valve member having a seat-engaging face adapted to cooperate with said valve seat for controlling the passage of fluid through the ports, said valve member having a passage therethrough in rear of said seat-engaging face and adapted to afford communication between the ports when the valve member is open, said valve casing having a wall portion spaced inwardly from the inner surface thereof whereby to provide an annular chamber around the inside of the casing without obstructing the free flow of fluid centrally therethrough, said valve member having a skirt portion extending between the inner surface of the valve casing and the outer surface of said wall portion and forming a movable wall of said chamber, and means providing restricted communication between the adjacent surfaces of said skirt portion and said wall portion for permitting retarded flow of fluid between the central fluid passage and said chamber whereby to check rapid movements of the valve member in opposite directions.

4. A check valve assembly for use in fluid pressure lines, comprising a valve casing having rigidly connected male and female parts each provided with a conduit connection, a valve seat disposed around the opening through the conduit connection on said female part, a valve member adapted to cooperate with said valve seat for controlling the passage of fluid and including a skirt portion extending inwardly of the casing and in contact with the inner surface of said female part, the said male part having an inwardly offset sleeve portion extending within said female part and toward the said valve member but terminating short thereof, said sleeve portion fitting within the skirt portion of the valve member to provide a variable annular cushioning chamber and defining a central passage for fluid passing through the casing, spring means disposed within said cushioning chamber and bearing against the skirt portion of said valve member for normally forcing the valve member toward a seated position, and means providing restricted communication between the cushioning chamber and central fluid passage through the casing for permitting retarded flow of fluid into and out of said cushioning chamber whereby to check rapid movements of the valve member.

5. A check valve assembly for use in fluid pressure lines, comprising a valve casing having rigidly connected male and female parts each provided with a port at the opposite ends thereof and conduit connecting means around the ports, a valve seat disposed around the port in said female part, said male part having an inwardly offset sleeve portion extending toward the valve seat at the opposite end of said female part but terminating short thereof, a valve member having a seat-engaging surface adapted to cooperate with said valve seat for controlling the passage of fluid and including a skirt portion in contact with the inner surface of the female part and having a telescoping fit around the adjacent end of the sleeve portion on said male part and defining therewith a variable annular cushioning chamber and a central passage for fluid through the casing, said valve member having openings therethrough in rear of the seat-engaging surface for permitting the passage of fluid centrally through the casing when the valve is opened, spring means disposed within the cushioning chamber and bearing against the skirt portion of said valve member for normally forcing the valve member toward a seated position, and means providing a restricted communication between the cushioning chamber and the central fluid passage through the casing for permitting retarded flow of fluid into and out of the cushioning chamber whereby to check rapid movements of the valve member.

ARTHUR L. PARKER.